C. FEUSER.
SAFETY VALVE.
APPLICATION FILED FEB. 27, 1917.
1,284,079.
Patented Nov. 5, 1918.
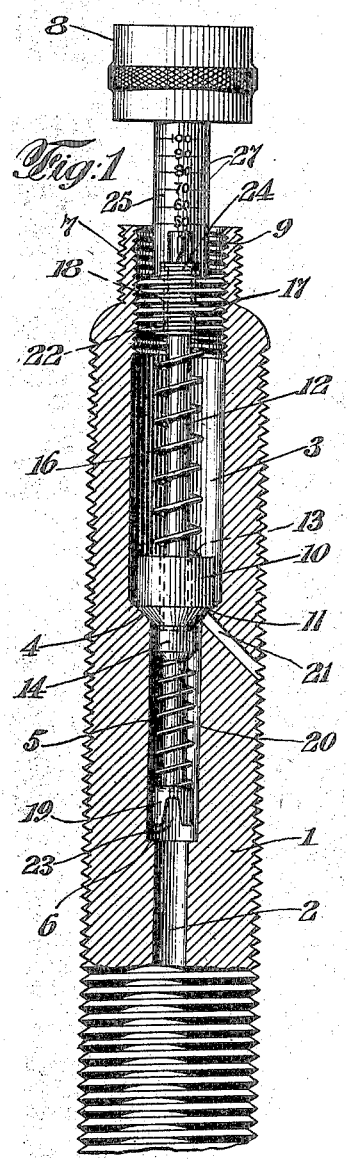
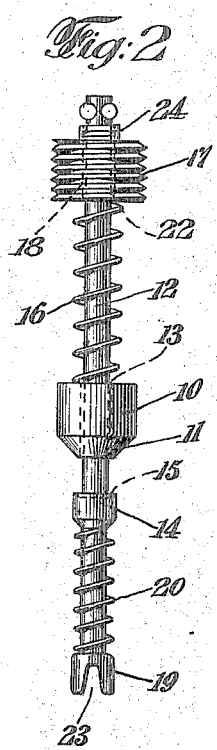
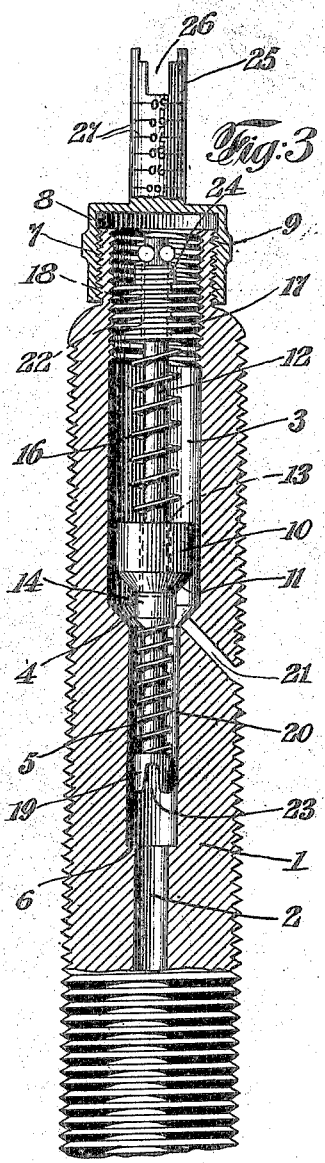
INVENTOR
Conrad Feuser,
BY
Prindle, Wright & Small
ATTORNEYS

UNITED STATES PATENT OFFICE.

CONRAD FEUSER, OF BLOOMFIELD, NEW JERSEY.

SAFETY-VALVE.

1,284,079.

Specification of Letters Patent.

Patented Nov. 5, 1918.

Application filed February 27, 1917. Serial No. 151,155.

*To all whom it may concern:*

Be it known that I, CONRAD FEUSER, of Bloomfield, in the county of Essex, and in the State of New Jersey, have invented a certain new and useful Improvement in Safety-Valves, and do hereby declare that the following is a full, clear, and exact description thereof.

My invention relates to a valve adapted to admit and retain fluid pressure in any desired chamber and to relieve such pressure when it exceeds a given amount, and while it is capable of use in any apparatus in which such a valve is desirable, it is especially adapted for use in connection with vehicle tires. As is well known, the pressure in such tires, due to heating of the gas within the tire, or over-inflation, or other causes, often exceeds a safe value, and by the use of my invention such excess pressure is automatically reduced to any desired amount.

Among the objects of my invention may be included the provision of a valve, simple in construction and containing few operating parts, and so designed that the several parts are readily removable and replaceable. It is also my object to provide a safety valve having its parts so arranged and proportioned that a valve casing of the type now in general commercial use will accommodate the elements of my device which provide the safety action of the valve, and to provide such a safety valve in which the relief valve may be easily adjusted to operate at any desired pressure.

While my invention is capable of embodiment in many forms, for the purposes of illustration I have shown but one form in the accompanying drawings, in which—

Figure 1 is a central longitudinal section of the valve, showing both inlet and relief valves in closed position, and showing the cap in position for adjusting the relief valve.

Fig. 2 is a view of the valve elements shown detached, with the relief valve elevated from its seat, and Fig. 3 is a view similar to Fig. 1, with the relief valve elevated and the cap in normal position.

My advice comprises a hollow valve casing 1 identical with the casing of the type of tire valve now in general commercial use, such casing being provided with a passage 2 leading to the interior of the tire, and such passage leading to a chamber 3 in the upper portion of the casing. The lower end of chamber 3 is shaped to provide a conical valve seat 4, and between the chamber 3 and passage 2 is located a cylindrical recess 5, such recess providing a shoulder 6 at the top of passage 2, for a purpose later to be described. Casing 1 is also provided at its upper end with external screw threads 7 to accommodate the usual cap 8, and with internal screw threads 9.

Within chamber 3 is located a valve 10 having a conical face 11 adapted to be seated upon valve seat 4 so as to shut off communication between chamber 3 and recess 5 when the valve is in closed position. A plunger 12 passes through the valve 10, and is of a smaller diameter than the hole in such valve in order to provide a clearance space 13 between the two members. Directly beneath the valve, a collar 14 is provided on plunger 12, said collar having a conically recessed upper face 15 adapted to be seated upon the adjacent conical face 11 of valve 10, so as to prevent communication between chamber 3 and recess 5 through the hole in the valve. A spring 16 surrounds the plunger 12, and normally holds valve 10 firmly in engagement with valve seat 4, the compression of the spring 16 being capable of adjustment by means of the threaded bushing 17, which engages interior threads 9 of the casing, and is provided with a hole 18 which receives the upper end of plunger 12. This hole 18 is made of larger diameter than plunger 12 so as to form an annular space 22 between the two members. The downward movement of plunger 12 is limited by means of a stop 19 adapted to engage with shoulder 6 of the casing, a spring 20 being provided on the plunger to bias the stop 19 to its lowermost position, so that this latter member forms a cushion for the plunger. Stop 19 is provided with slots 23 to permit the passage of fluid from recess 5 to passage 2.

In order to provide for the adjustment of spring 16, threaded bushing 17 is provided with a shoulder 24, and cap 8, at its smaller end 25 is shaped to provide a socket wrench 26, so that the cap may be used to vary the compression of the spring, the pressure to which the relief valve is adjusted being denoted by graduations 27 upon part 25 of the cap.

In the operation of the device, fluid under pressure may be admitted to passage 2 by attaching the source of fluid supply to threads 7, after which the fluid pressure will depress plunger 12, lowering the collar 14 from engagement with conical face 11 so that fluid under pressure may be passed through annular spaces 22 and 13, past collar 14 and stop 19 to passageway 2. When the exterior pressure is removed, the pressure within passage 2 will seat collar 14 upon conical face 11 of valve 10, and as the spring 16 is strong enough to hold valve 10 against valve seat 4 under ordinary pressure, communication from the passage 2 to chamber 3 will be entirely cut off. Should the pressure within passage 2 exceed a certain amount (depending upon the adjustment of bushing 17), valve 10 will be raised from its seat 4, thus opening communication between passage 2 and a relief outlet, or vent, 21, which permits the escape of fluid until the pressure within passage 2 is again balanced by spring 16.

The device thus forms a safety valve construction which may be employed with tire valves of a type now generally in use since, as above described, the valve casing is identical with the present form of casing, so that to substitute my safety valve for the present type it is merely necessary to substitute the elements shown in Fig. 2 of the drawings for the plunger of the present form of valve.

While I have described my invention in detail, it is obvious that many changes may be made in the construction of the valve which will still be within the spirit of the invention.

I claim:

1. In combination a hollow casing having an interior seat, a valve adapted to engage said seat, a plunger passing through said valve and having a collar adapted to close the opening therethrough, and a spring surrounding the plunger and held in position thereby, said spring being adapted to press the valve into engagement with its seat.

2. In combination a hollow casing having an interior seat, a valve adapted to engage said seat, a plunger passing through said valve and having a collar adapted to close the opening therethrough, a stop limiting the movement of said plunger, and a spring surrounding the plunger and held in position thereby, said spring being adapted to press the valve into engagement with its seat.

3. In combination a hollow casing having an interior seat, a valve normally engaging said seat, a plunger passing through said valve and having a collar beneath the valve normally closing the opening therethrough, a spring biasing said valve to engagement with its seat, and a bushing abutting said spring and providing a bearing for said plunger.

4. In combination a hollow casing having an interior seat, a valve normally engaging said seat, a plunger passing through said valve and having a collar beneath the valve normally closing the opening therethrough, a spring above said valve surrounding said plunger and held in position thereby, said spring biasing said valve to engagement with its seat, and a bushing abutting said spring and providing a bearing for said plunger.

5. In combination a hollow casing having an interior seat, a valve normally engaging said seat, a plunger passing through said valve and having a collar beneath the valve normally closing the opening therethrough, a spring biasing said valve to engagement with its seat, and an adjustable bushing abutting said spring and providing a bearing for said plunger, said bushing having a projection upon the outer face thereof, and a cap for said casing, the outer end of said cap being formed to fit said projection.

6. In combination a hollow casing having an interior seat, a valve normally engaging said seat, a plunger passing through said valve having a collar beneath the valve normally closing the opening therethrough, a spring surrounding said plunger and held in position thereby, said spring biasing said valve to engagement with its seat, and an adjustable bushing abutting said spring and providing a bearing for said plunger, said bushing having a projection upon the outer face thereof, and a cap for said casing, the outer end of said cap being formed to fit said projection.

7. In combination a hollow casing containing a spring pressed relief valve, an adjustable member within said casing for varying the compression of said spring, a cap for said casing, said cap having a part adapted to engage said member to adjust the same, said cap being graduated to indicate the pressure at which the relief valve is set.

8. In combination, an interiorly threaded casing, a spring pressed relief valve therein, a threaded bushing controlling the compression of said spring, said bushing having a projection upon the outer face thereof, and a cap for said casing, the outer end of said cap being formed to fit said projection and being graduated to indicate the pressure at which the relief valve is set.

In testimony that I claim the foregoing I have hereunto set my hand.

CONRAD FEUSER.

Witness:
F. T. CRAMER.